Feb. 26, 1952   R. M. ASHBY ET AL   2,586,772
PHOTOGRAPHIC SYSTEM FOR MOVING TARGET INDICATION
Filed March 10, 1947   2 SHEETS—SHEET 1

*INVENTORS*
ROBERT M. ASHBY
JAMES H. MUNCY

BY

*ATTORNEY*

Patented Feb. 26, 1952

2,586,772

UNITED STATES PATENT OFFICE 2,586,772

PHOTOGRAPHIC SYSTEM FOR MOVING TARGET INDICATION

Robert M. Ashby and James H. Muncy, Cambridge, Mass.

Application March 10, 1947, Serial No. 733,714

19 Claims. (Cl. 343—9)

(Granted under the act of March 3, 1883, as amended April 30, 1928; 370 O. G. 757)

This invention relates in general to a radar moving target indication system, and more particularly to a photographic system of moving target indication.

For a detailed analysis of the present day electronic moving target indication techniques, reference is made to the copending applications of Robert H. Dickie, Serial No. 590,052, filed April 24, 1945, Patent No. 2,535,274, granted December 26, 1950; Alfred G. Emslie, Serial No. 594,266, filed November 26, 1945, Patent No. 2,512,144, granted June 20, 1950; and Gordon D. Forbes and Herbert Shapiro, Serial No. 608,309, filed August 1, 1945, Patent No. 2,540,720, granted February 6, 1951. The operation of the systems disclosed in the above-mentioned applications is briefly as follows:

Radar echoes of objects moving toward or away from the radar station are distinguishable from those of stationary objects since the R. F. phase of electromagnetic energy returning from the former changes from pulse to pulse, while the phase energy of the latter remains constant. To make evident changes in R. F. phase, the incoming radar signals are beat against a stable reference oscillation which is locked in fixed phase relation with the R. F. oscillations making up the output radar pulse. The beat signal formed by a moving target echo fluctuates in amplitude at a frequency determined by the R. F. wavelength employed and the so-called radial velocity at which the target is moving toward or away from the radar system. The beat signal of the stationary object remains constant in amplitude. Moving and stationary targets are then distinguished from one another by retaining or storing the beat signal wave of one output pulse and comparing it with the beat wave of the next subsequent pulse. When differences occur in the two waves, a moving target is known to exist and can be made evident on conventional radar indicators. To store and compare subsequent pulses, delay lines or storage tubes are employed.

A failing of this type of moving target indicator (MTI) is that it is not capable of detecting targets which move toward or away from the radar station, a distance equal to an integral number of half wavelengths of the R. F. output energy during a single pulse period. A series of so-called "blind" velocities which are integral multiples of one another are the result. The present invention contemplates the elimination of such "blind" spots in the velocity spectrum by eliminating the need for definite synchronization and the electronic storage comparison of pulses. The necessarily complicated circuits and devices which are necessary in the electronic MTI systems are thus eliminated. Instead of these electronic circuits to indicate the presence of moving targets, the present inventions involves frame to frame cancellation with the storage of information on photographic film. With moving target information thus stored, a projection system is utilized to present a large magnification of the cathode ray image in the manner shown in the copending application of Leroy L. Blackmer, Jr., Serial No. 635,788, filed December 18, 1945, and entitled "Photographic Projection Indicator." By the method hereinbelow described, it is possible to provide on a large plot of the area surrounding the radar station indications of only the moving targets in the area.

Accordingly, a primary object of this invention is to provide a photographic system for use in cooperation with a radar system capable of distinguishing moving objects from stationary ones.

Another object of this invention is to provide a novel arrangement for producing a magnified presentation of the moving target activity about a radar installation. Briefly, this is accomplished by photographing a plan position indicator during the period of one complete revolution of the antenna, rapid development of the negative thus exposed, projection printing of the negative to obtain a positive, rapid development of positive with the following negative, and superimposed projection of the positive and the following negative upon a screen with the magnification required.

It is a further object of this invention to simplify the process of obtaining a large plot of moving target activity and improving the accuracy thereof by successively projecting upon a screen superimposed positive and negative photographs of a plan position indicator whereby only moving targets are shown.

A still further object of this invention is to provide a novel method of indicating the velocity vector of moving targets. Briefly, this is accomplished by the simultaneous projection of two pairs of positives and negatives which are spaced apart on a film by a predetermined time interval. For purposes of identification, the projection of the two pairs may be projected in two colors, thereby indicating the direction of movement of the target.

These and other objects of the present invention will now become apparent from the following detailed specification taken in connection with the accompanying drawings, in which.

Figure 1:
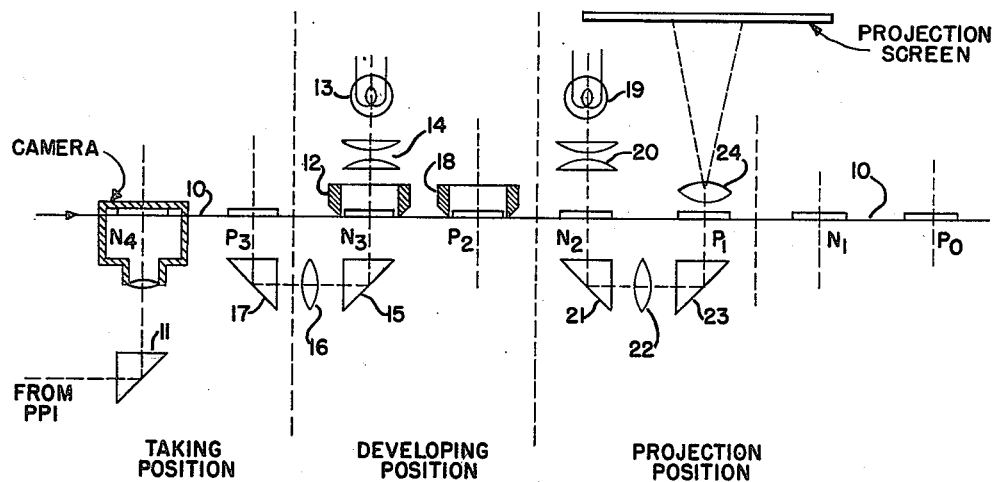
Fig. 1 is a diagrammatic view of one embodiment of this invention wherein is shown a system for the development, printing and projection of single pictures.

Referring now to Fig. 1, there is illustrated in diagrammatic form apparatus for the storage of moving target information on photographic film. A photographic film 10 is fed through the apparatus from left to right regularly and automatically by timing mechanisms and winding reels (not shown). The film is shown with increased thickness at equally spaced intervals to represent the position of positives ($P_0$, $P_1$ etc.) and negatives ($N_1$, $N_2$, etc.) on the film. As mentioned above, the present invention involves the exposure of a film to the plan position indicator, development thereof to provide a negative, projection printing of this negative to obtain a positive, development of this positive simultaneously with the following negative, and projection onto a screen of the positive and the following negative. The film 10, which is preferably of conventional perforated movie size, is passed through the system from left to right with its emulsion side up. As a new section, $N_4$, of film 10 enters the apparatus, the radar presentation upon the face of the cathode ray tube (not shown) of the radar search system is focused through the film base upon the emulsion of film 10 by a suitable optical system designated by 11. The film is maintained at the position designated $N_4$ for a period of time equal to the time for a single revolution of the radar antenna. After this scan, which may take about ten seconds, assuming an antenna rotational speed of 6 R. P. M., film 10 is moved over by the timing device (not shown) into the region marked developing position. After this movement, the exposed section of the film is positioned at the point designated $N_3$ where the negative is rapidly developed in the manner described in the above-mentioned copending application, Serial No. 635,788. Briefly, the developer, which is maintained at the proper temperature, is introduced into cup 12 which retains it in position on the exposed region $N_3$ of the film for a development time of the order of one second. The developer is then removed from cup 12 by a vacuum system (not shown), and the fixer is introduced and retained for the proper time, and then also removed by a vacuum system (not shown). Immediately upon completion of the development, and with the film maintained in the position it was during development, the negative, $N_3$, is projection printed onto a region of the film between the negative, $N_3$, and exposure, $N_4$, of the following scan. A short flash of light from source 13 through a suitable optical system, designated by 14, 15, 16 and 17, is all that is required to expose the film in the region designated $P_3$, as a positive of the negative $N_3$. During this process, of course, a new negative is being exposed on the film at $N_4$.

After the projection printing of $N_3$ to produce positive exposure at $P_3$, and the antenna has made another complete scan, the film 10 is again advanced, with $N_3$ moving into the position designated $N_2$, and $P_3$ into the position $P_2$. The projection print (now $P_2$) together with the exposed region of the following scan (now $N_3$) are now in the developing position, where $P_2$ and $N_3$ are developed simultaneously by the method described above. One development cup 12 can be used for the negative $N_3$ and another cup 18 can be used for the positive $P_2$, or a large cup can be used which will cover the area of both the negative and the positive. It is thus seen that a negative and positive print is obtained for each scan of the radar antenna. Upon completion of the development, and projection printing of the negative (now $N_3$) the film 10 is advanced and $N_3$ and $P_2$ are moved to the projection position at $N_2$ and $P_1$, respectively. In this position, with an optical system similar to that used in connection with the projection printing procedure, described above, comprising a light source 19 and optical components 20, 21, 22, 23 and 24, $N_2$ is imaged on $P_1$, and both are imaged on a projection screen with great magnification. It is thus seen that the positive of one scan is superimposed on the negative of the following scan. How this projection presents moving target information will be presently described.

Since many of the above described steps occur simultaneously, it will be well to summarize the operation using the designations on the film in the position shown in Fig. 1. $P_0$ and $N_1$ have passed through the apparatus. $P_1$ (the positive of $N_1$) is being projected with $N_2$, the following negative. Simultaneous with this projection, $P_2$ (the positive of $N_2$) and $N_3$ (the next following negative) are being developed, and $N_3$ projection printed at $P_3$, and $N_4$ is being exposed by a new image from the PPI scope. Assuming an antenna rotation of 6 R. P. M., then, it is apparent that ten seconds after $N_4$ is completely exposed it will be projected on the screen along with $P_3$.

Figure 2:
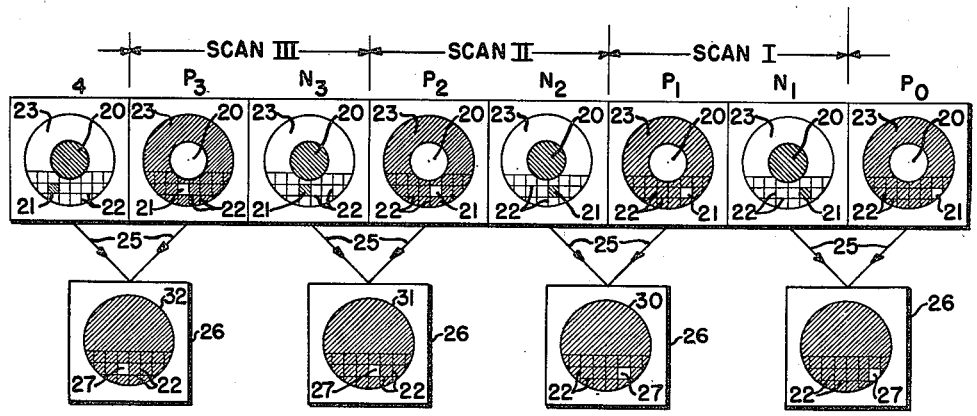
Fig. 2 illustrates a representative series of photographs on a segment of film as applied to Figure 1.

Referring now to Fig. 2, there is illustrated a representative series of photographs on a segment of film 10, which was produced in the manner described above. The positive and negative frames are identified similarly with the respective frames of the film of Fig. 1. $P_0$, for example, is a positive picture of the PPI scope. The inner circle 20, which shows light on the positive, represents "ground clutter" which appears near the center of the PPI presentation. The light spot 21 on the photograph represents a moving target, which will be presently seen, is moving from right to left on the PPI presentation. The conventional PPI presentation comprises a polar coordinate plot, but for purposes of clarity and definiteness, the photograph has been partially marked off in a rectangular coordinate system 22, 22. The darkened area 23, represents the portion of the PPI presentation which contains no targets. $N_1$, which is the negative following $P_0$, is the reverse of $P_0$. The "ground clutter" area 20 shows up dark, and the portion 23, which contains no target, appear light, and the target 21 appears dark. It will be observed that during the time between the exposure of $N_0$ (to produce $P_0$) and the exposure of $N_1$, that target 21 has moved to the left one space. Examination of $P_1$ will indicate that it is the exact reverse of $N_1$, which is to be expected, since $P_1$ is a projection print of $N_1$.

As previously mentioned, moving target information is derived from the film by the simultaneous projection of a positive and the following negative. This projection is achieved by the apparatus in Fig. 1 and is shown diagrammatically in Fig. 2, by lines 25, 25. The resulting projection 26 is shown in the same size as the frames of the film, but in actual operation they will be greatly enlarged. It will be observed that, if $P_0$ is placed upon $N_1$, the darkened area 23 of $P_0$ will fill in the light area 23 of $N_1$, and the dark central area 20 of $N_1$ will fill in the light area of $P_0$. The target 21, however, will not be blanked out, since the light area 21 of $P_0$ falls upon the light area 23 of $N_1$. The target, therefore, is presented as a light spot 27 on the projection screen 26, with all the rest of the area blanked out.

As the film 10 moves through the projection apparatus described in connection with Fig. 1, projections 30, 31 and 32 are successively presented on screen 26 by the simultaneous projection of $N_2$ and $P_1$, $N_3$ and $P_2$, and $N_4$ and $P_3$, respectively. It will be observed that in each projection the two photographs completely cancel each other, except for the moving target 27, which has been illustrated to have moved three spaces to the left during the period of three scans. Since the moving target is all that appears on the screen, it can be conveniently and accurately marked on the screen after each scan, whereby an accurate continuous plot of the path of the target is obtained.

Figure 3:
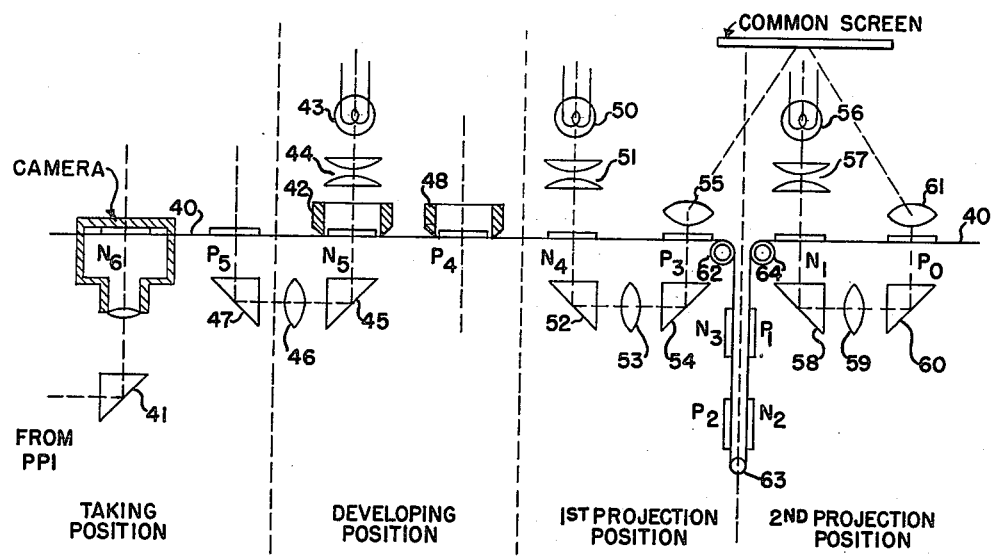
Fig. 3 is a diagrammatic view of a second embodiment of this invention wherein is shown a system adapted for velocity vector indication.

Referring now to Fig. 3, there is illustrated in diagrammatic form apparatus wherein the present invention is adapted for use as a velocity vector indicator. As in the apparatus of Fig. 1, film 40 is fed through the apparatus from left to right regularly and automatically by a timing mechanism and winding reels (not shown). In the taking position, the radar presentation on the face of the PPI (not shown) is focused by suitable optical means 41 to expose the film at $N_6$. After exposure, the film is advanced, $N_6$ to the $N_5$ position, where the negative is rapidly developed by the successive introduction of developing and fixing fluids into cup 42. A projection print $P_5$ is made from $N_5$ by directing a flash of light from source 43 through optical elements 44, 45, 46 and 47. After this projection printing of $N_5$ to produce the positive at $P_5$, the film 40 is advanced, with $N_6$ moving into the position designated $N_5$, and $P_5$ into position $P_4$. $N_5$ and $P_4$ are developed simultaneously as described in the discussion of Fig. 1, development cup 42 being used for the negative, and a second cup 48 being provided for the positive.

Now, instead of the projection of a single pair of images, two pairs of images are projected simultaneously to present the velocity vector of the moving target. As shown in Fig. 3, $N_4$ and $P_3$ are projected on a screen by a suitable system comprising a light source 50, and optical elements 51, 52, 53, 54 and 55. Simultaneously with the projection of $N_4$ and $P_3$, $N_1$ and $P_0$ are projected on the same screen with the two projected images superimposed on each other. $N_1$ and $P_0$ are projected by a similar system comprising a light source 56, and suitable optical elements 57, 58, 59, 60, and 61. Element 61 preferably includes a colored filter, the purpose of which will be presently described.

It will be noted that by shunting the film 40 over pulleys 62, 63 and 64, two frames of the film are skipped between the two projections. This feature allows time for some movement between the two target images, so that its direction of movement can be clearly seen.

Figure 4:
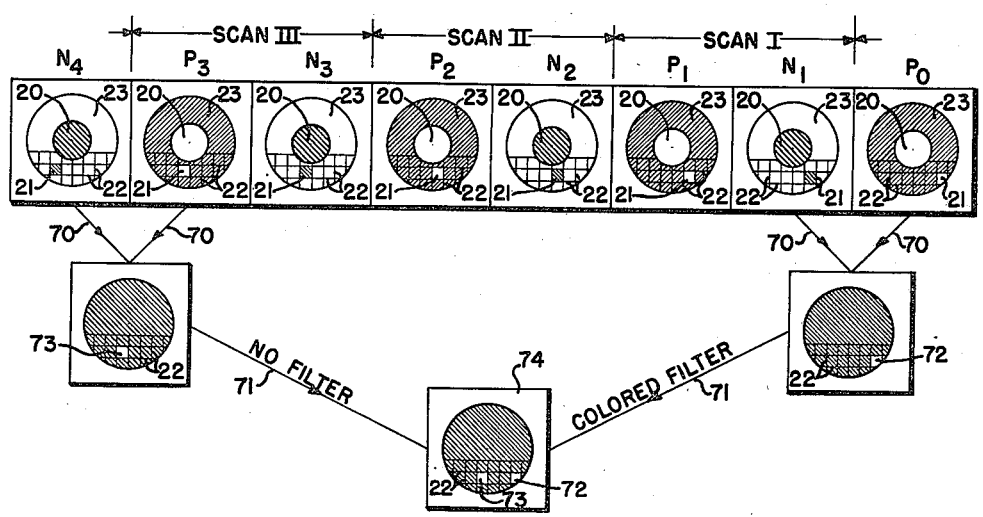
Fig. 4 illustrates a representative series of photographs on a segment of film and projections thereof as applied to Figure 3.

Examination of Fig. 4 will more clearly illustrate the operation of the apparatus of Fig. 3. Fig. 4 illustrates a segment of film 40 designated in the same manner as that of Fig. 3. "Ground clutter" is identified by reference number 20, the area surrounding the "clutter" is 23, and the target is shown at point 21 on both positive and negative. Lines 70, 70 illustrate diagrammatically the superposition of a positive and the next following negative, and lines 71, 71 illustrate the simultaneous projection of these two images onto a single screen. By the superposition of $N_1$ and $P_0$, in the manner described in connection with Fig. 2, the entire image is blacked out except the moving target 72. Similarly, by the superposition of $N_4$ and $P_3$, three scans later, the entire image is blacked out except the moving target, which now has a new position and is designated 73. By the simultaneous projection of these two images on a screen 74, an image results which is entirely darkened except for the two light spots indicating two locations of the moving target. With a colored filter used through which to project the image of $P_0$ and $N_1$, the target will appear in color as point 72 on screen 74 and will appear as a white spot at 73 since no filter is used in the projection of $N_4$ and $P_3$. The two colors thus indicate the direction of motion of the target (in this case from colored to white), and the displacement between the two spots will be proportional to the speed of the target. Choice of a suitable scale on the screen and antenna rotational speed makes it possible to accurately determine the speed of the moving target.

The system of moving target indication was hereinabove discussed in connection with a moving target in a region not occupied by "ground clutter" on the scope. Since film has considerable latitude, it is possible to modify the system to permit the indication of certain highly reflecting moving targets also in the regions containing "clutter."

Since various modifications and extensions of the principles hereinabove set forth may become apparent to those skilled in the art, it is preferred that this invention be defined solely by the spirit and scope of the appended claims.

The invention described herein may be manufactured and used by or for the Government of the United States of America for government purposes without the payment of any royalty thereon or therefor.

What is claimed is:

1. Apparatus for producing a comparatively large plot of a moving radar target comprising a plan position indicator providing a presentation of said moving target, a camera focused upon said plan position indicator presentation, a film strip, means for periodically exposing successive film sections in said camera, means for rapidly processing said exposed film sections to obtain a succession of negatives of said presentation, means operative substantially immediately upon the completion of said film processing for projection printing said negatives to obtain a like succession of positives, each disposed adjacent its respective negative on said film strip, means for processing said positives, the processing of said positives occurring simultaneously with the processing of the next successive negative, and means for projecting upon a screen the superimposed images of each of said positives and the next successive negative processed thereafter.

2. Apparatus for presenting the velocity vector of a moving radar target comprising a plan position indicator providing a presentation of said moving target, a camera focused upon said plan position indicator presentation, a film strip, means for periodically exposing successive film sections in said camera, means for rapidly processing said exposed film sections to obtain a succession of negatives of said presentation, means operative substantially immediately upon the completion of said film processing for projection printing said negative to obtain a like succession of positives each disposed adjacent its respective negative on said film strip, means for processing said positives, the processing of said positives occurring simultaneously with the processing of the next successive negative, first and second projection means through which said film sections are fed, means in said first projection means for projecting upon a screen the superimposed images of a first of said positives and the negative following thereafter, means in said second projection means for simultaneously projecting upon the same screen the superimposed image of a second of said positives and the negative following thereafter, said second positive being spaced on said film a predetermined number of sections from said first positive.

3. Apparatus as in claim 2 wherein said second projection means includes a colored filter.

4. The method of obtaining moving target information from data gathered by a radar system, which comprises the steps of intermittently photographically obtaining successive latent images of the presentation of said radar system, rapidly developing and fixing each latent image to provide a series of negatives of said presentation, projection printing each of said negatives to obtain a like series of positives of said presentation, and successively projecting the superimposed images of each positive and the next successive negative developed thereafter.

5. The method of producing a comparatively large plot of moving target information gathered by a radar system which comprises the steps of periodically photographically obtaining successive latent images of said target presentation, rapidly chemically processing each of said latent images to provide a succession of negatives of said presentation, projection printing and chemically processing each of said negatives to obtain a like succession of positives each disposed adjacent to its respective negative, and successively projecting the superimposed images of each positive and the next successive negative developed thereafter.

6. The method of presenting the velocity vector of a moving radar target presented on a cathode ray tube plan position indicator which comprises the steps of periodically photographically obtaining successive latent images of said target presentation, rapidly chemically processing each of said latent images to provide a succession of negatives of said presentation, rapidly projection printing and chemically processing each of said negatives to obtain a like succession of positives each disposed adjacent its respective negative, and simultaneously projecting spaced pairs of superimposed images, each of said spaced pairs being a positive and the following later exposed negative of said target presentation.

7. The method of claim 6. which includes the step of projecting one of said spaced pairs in a distinctive color, whereby the sense of direction of said velocity vector is indicated.

8. Apparatus for producing a comparatively large plot of a moving radar target comprising a plan position indicator providing a presentation of said moving target, a photographic film, means for periodically exposing successive sections of said film to said plan position indicator presentation, means for rapidly processing said exposed film to obtain a negative of said presentation, means for printing and processing positives of each of said negatives, each positive being disposed on said film adjacent its respective negative, and means for projecting upon a screen the superimposed images of each of said positives and the following later exposed negative.

9. Apparatus for presenting the velocity vector of a moving radar target comprising in combination, a plan position indicator providing a presentation of said moving target, a photographic film, means for periodically exposing successive sections of said film to said presentation, means for rapidly and successively processing said exposed film sections to obtain a series of spaced negatives of said presentation, means for printing and processing positives of each of said negatives, each positive being disposed on said film adjacent its respective negative, first and second projecting means through which said film sections are fed, shunting means whereby the film section arriving at said first projection means is spaced a predetermined integral number of sections from the film section arriving at said second projection means as said film is fed therethrough, and a screen, means in said first projection means for projecting upon said screen the superimposed image of a first of said positives and the negative following thereafter, means in said second projection means for simultaneously projecting upon the same screen the superimposed image of a second of said positives and the negative following thereafter spaced from said first positive by said spacing means said predetermined integral number of sections.

10. Apparatus for producing a comparatively large plot of moving target information from data gathered by a radar system comprising, a screen, means for periodically photographically storing said data, and means for thereafter projecting upon said screen superimposed images of data stored during time separated periods.

11. Apparatus for producing a comparatively large plot of moving target information from a plan position indicator comprising, a screen, means for periodically photographically storing the data presented by said plan position indicator, and means for thereafter projecting upon said screen superimposed images of data stored at selected time separated periods.

12. Apparatus for producing a comparatively large plot of moving target information from data gathered by a radar system comprising, means for producing a series of photographic positives and negatives of the presentation of said system, a screen, and means for successively projecting upon said screen the superimposed images of each positive and the following later produced negative.

13. Apparatus for producing a comparatively large plot of moving target information from data gathered by a radar system comprising, a photographic film, means for producing on said film a series of negatives and positives of the presentation of said system, a screen, and means for successively projecting upon said screen the superimposed images of each positive and the following later produced negative.

14. Apparatus for producing a comparatively large plot of moving target information from data gathered by a radar system comprising, a photographic film, means for producing on said film a series of negatives and positives of the presentation of said system, each positive being disposed on said film adjacent its respective negative, a screen, and means for successively projecting upon said screen superimposed images of each of said positives and the following later produced negative.

15. Apparatus for obtaining moving target information from data gathered by a radar system comprising, a photographic film, means for exposing said film to obtain successive latent images of the presentation of said radar system, means for rapidly chemically processing each of said latent images to provide a series of photographic negatives of said presentation, means for printing and processing positives of each of said negatives to obtain a like series of positives each disposed adjacent to its respective negative, a screen, and means for successively projecting upon said screen the superimposed images of each positive and the following later exposed negative.

16. Apparatus for presenting the velocity vector of a moving radar target comprising, a plan position indicator providing a presentation of said moving target, a strip of photographic film, means for producing on said film a series of positives and negatives of said presentation, each positive being disposed on said film strip adjacent its respective negative, first and second projection means through which said film strip is fed, means in said first projection means for projecting upon a screen superimposed images of a first of said positives and the following later produced negative, means in said second projection means for simultaneously projecting upon the same screen the superimposed images of a second of said positives and the negative following thereafter, and means for spacing said second positive a selected number of positives from said first positive.

17. Apparatus in accordance with claim 16 in which one of said projection means includes a colored lens whereby the direction of said velocity vector is indicated.

18. Apparatus for presenting the velocity vector of a moving radar target comprising, a plan position indicator providing a presentation of said moving target, a photographic film, means for periodically exposing successive sections of said film to said indicator presentation, means for rapidly processing said exposed film to obtain a series of negatives of said presentation, means for printing and processing positives of each of said negatives, each positive being disposed on said film adjacent its respective negative, a screen, first projection means for projecting upon said screen the superimposed images of a first of said positives and the following later exposed negative, second projection means for simultaneously projecting upon said screen the superimposed images of a second of said positives and the next later exposed negative following thereafter, and means for spacing said second positive a selected number of sections from said first positive.

19. Apparatus in accordance with claim 18 wherein one of said projection means includes a colored lens.

ROBERT M. ASHBY.
JAMES H. MUNCY.

REFERENCES CITED

The following references are of record in the file of this patent:

UNITED STATES PATENTS

| Number | Name | Date |
| --- | --- | --- |
| 1,135,919 | Pilkington | Apr. 13, 1915 |
| 2,198,815 | Haskin | Apr. 30, 1940 |
| 2,275,898 | Goldsmith | Mar. 10, 1942 |
| 2,323,534 | Goddard | July 6, 1943 |
| 2,412,670 | Epstein | Dec. 17, 1946 |
| 2,414,319 | Milholland | Jan. 14, 1947 |
| 2,437,173 | Rutherford | Mar. 2, 1948 |
| 2,446,668 | Tuttle | Aug. 10, 1948 |
| 2,459,481 | Wolff | Jan. 18, 1949 |
| 2,460,350 | Hinman | Feb. 1, 1949 |
| 2,530,828 | Leverenz | Nov. 20, 1950 |